(12) United States Patent
Slayne et al.

(10) Patent No.: US 8,282,308 B2
(45) Date of Patent: Oct. 9, 2012

(54) FASTENER

(75) Inventors: Andrew Robert Slayne, Bristol (GB); Christopher Mark Needes, Bristol (GB); Marcus Baker, Bristol (GB)

(73) Assignee: Saint-Gobain Performance Plastics Rencol Limited, Coventry (GB)

( * ) Notice: Subject to any disclaimer, the term of this patent is extended or adjusted under 35 U.S.C. 154(b) by 0 days.

(21) Appl. No.: 11/579,047

(22) PCT Filed: Apr. 29, 2005

(86) PCT No.: PCT/GB2005/001663
§ 371 (c)(1),
(2), (4) Date: Oct. 27, 2006

(87) PCT Pub. No.: WO2005/106269
PCT Pub. Date: Nov. 10, 2005

(65) Prior Publication Data
US 2008/0247815 A1  Oct. 9, 2008

(30) Foreign Application Priority Data

Apr. 30, 2004 (GB) .................................. 0409690.5
Apr. 29, 2005 (GB) .................................. 0508795.2

(51) Int. Cl.
*F16B 2/22* (2006.01)
(52) U.S. Cl. ....................................... 403/372; 411/521
(58) Field of Classification Search .................. 403/367, 403/371, 372, 365; 411/516, 520, 521; 24/458; 384/535, 581
See application file for complete search history.

(56) References Cited

U.S. PATENT DOCUMENTS

| 3,139,768 | A | * | 7/1964 | Biesecker | 403/372 |
| 3,197,243 | A | * | 7/1965 | Brenneke | 403/372 |
| 3,433,119 | A | * | 3/1969 | Ballantyne et al. | 411/437 |
| 4,327,947 | A | * | 5/1982 | Bower, Jr. | 411/521 |
| 4,376,254 | A | * | 3/1983 | Hellmann | 403/365 |
| 4,801,230 | A | * | 1/1989 | Wilburn | 411/520 |
| 4,814,961 | A |   | 3/1989 | O'Brien et al. | |
| 4,828,423 | A | * | 5/1989 | Cramer et al. | 403/372 |
| 4,892,434 | A | * | 1/1990 | Miller | 403/361 |
| 6,152,667 | A | * | 11/2000 | LeVey | 411/521 |

FOREIGN PATENT DOCUMENTS

| DE | 1 855 948 | 8/1962 |
| DE | 295 09 851 | 10/1995 |
| EP | 1 067 336 | 6/2000 |
| GB | 1 094 610 | 12/1967 |
| GB | 1 297 599 | 11/1972 |
| GB | 1 386 738 | 3/1975 |

* cited by examiner

*Primary Examiner* — Michael P Ferguson
(74) *Attorney, Agent, or Firm* — Abel Law Group, LLP; Chi Suk Kim

(57) ABSTRACT

A fastener (11) in the form of a strip (12) of material in the form of a ring which in plan view is profiled to conform to an annular gap (H) between a first component (A) bounded by the fastener (11) and a second component (B) bounding the fastener (11); the ring member having ends providing a gap (G) in plan view; the strip of material having a first side (14) and a second side (15); and having a series of integral fingers (16-23) spaced along the length of the ring and projecting, in plan view, outwardly from the ring whether from the first side (14), the second side (15), or both sides thereof. In a further version the ring includes a further series of discrete projections formed integrally from the strip and lying around the ring member in between members of the series of fingers.

4 Claims, 2 Drawing Sheets

FASTENER

TECHNICAL FIELD

This invention relates to a fastener. It is particularly concerned with a fastener providing for retention of a first component within a second component where there is a relatively wide clearance between the first and second components.

SUMMARY

According to the present invention a fastener in the form of a ring member is fabricated from a strip of material which member in plan view is profiled to conform to an annular gap between a first component bounded by the fastener and a second component bounding the fastener; the ring in plan view defining ends bounding a gap in plan view; the ring member having a first side and a second side; and having a series of integral fingers spaced along the length of the ring member and projecting, in plan view, outwardly from the ring member whether from the first side, the second side, or both sides thereof.

According to a first preferred version of the present invention the fastener includes a further series of discrete projections formed integrally from the ring member and lying around the ring member in between members of the series of fingers.

According to a second preferred version of the present invention or of the first preferred version thereof the fingers of the series all extend outwardly from either the first side or the second side or both sides of the ring member.

According to a third preferred version of the first preferred version of the present invention or of the second preferred version when reading on the first preferred version thereof is characterised in that the discrete projections of the further series all extend outwardly from either the first side, the second side or both sides of the ring member.

According to a fourth preferred version of the present invention or of any preceding preferred version thereof at least one of the fingers of the series extends outwardly from the first side and the remaining fingers of the series extend outwardly from the second side of the ring member.

According to a firth preferred version of the first preferred version or of any preceding preferred version dependent on the first preferred version the fastener is characterised by at least one of the discrete projections extend outwardly from the first side and the remaining discrete projections extending outwardly from the second side of the ring member.

According to a sixth preferred version of the present invention or of any precedeing preferred version thereof each finger is of a first outline and is produced by being punched from the strip so as to leave an aperture wherein the aperture differs in shape from the first outline.

BRIEF DESCRIPTION OF DRAWINGS

Exemplary embodiments of the invention will now be described with reference to the accompanying drawings of a fastener of which.

DETAILED DESCRIPTION

Figure 1:
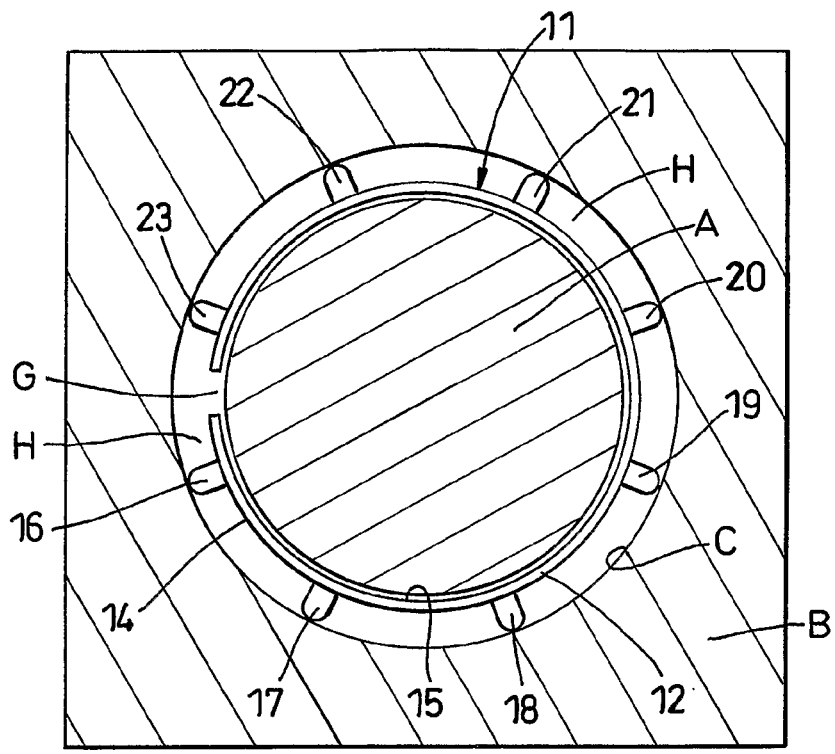
FIG. 1 is a plan view of a first embodiment.
Figure 2:
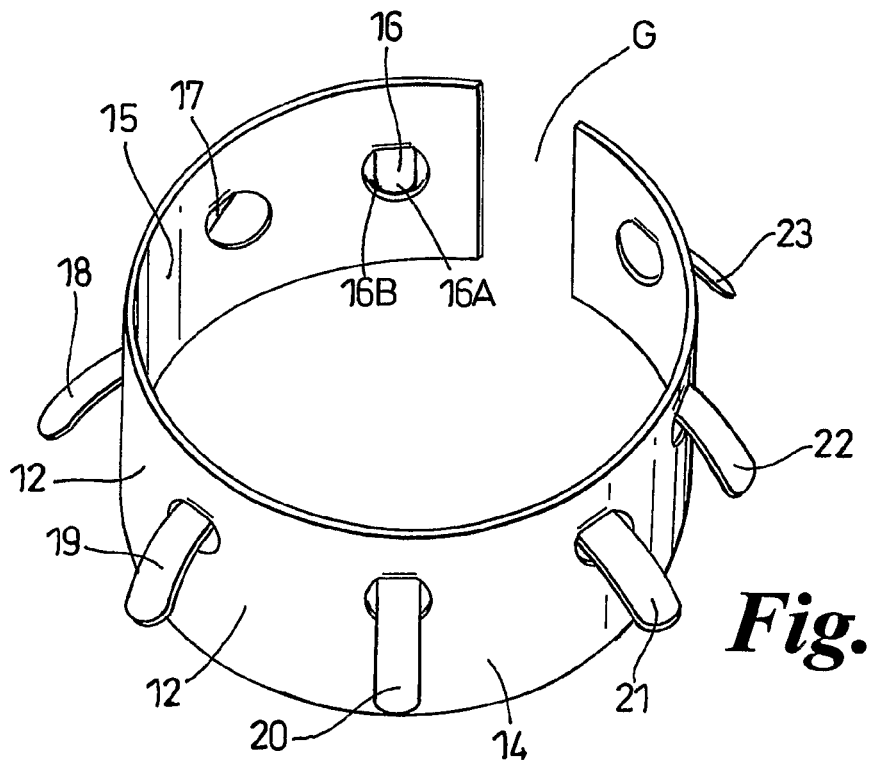
FIG. 2 is a perspective view of the fastener of FIG. 1.

First Embodiment:FIGS. 1 and 2

These variously show a fastener 11 in the form of a strip 12 of spring steel in the form of a ring which in plan view is profiled to conform to an annular gap H (FIG. 1) between a first component A (shown in dashed outline) bounded by the fastener 11 and a second component B (shown in dashed outline) bounding the fastener 11. The strip 12 in this case is circular in plan since it intended to locate circular first component A in a circular bore C in the second component B. The strip 12 is formed to leave a gap G to allow a degree of flexure of the fastener 11 when it is installed. The strip 12 has a first, outer, side 14 and a second, inner, side 15. A series of integral spring fingers 16-23 are spaced along the length of the strip. The fingers 16-23 are rectangular in shape with shaped ends (typically end 16A) and are punched from the body of the strip to leave an elliptical aperture (typically aperture 16B) in the strip 12.

For a given application the fastener can be adapted to achieve a required performance by modifying one or more of the following characteristics:

profile and number of the fingers;

profile of the aperture formed in the body of the strip for each finger;

material from which the fastener is made;

dimensions of the strip.

In the exemplary embodiment the fingers 16-23 project radially outwardly from the first, outer, side 14 of the strip 12. Thus, as shown in FIG. 1, the fastener 11 seats by way of second, inner, side 15 on first component A and engages the second component B by way of fingers 16-23.

In an alternate version the fingers can project radially inwardly from a second, inner side, of the strip so that the fastener seats by way of a first outer side on a bore wall in a second component and engages a first component by way of the inwardly projecting fingers.

It is also envisaged that a fastener can be manufactured with fingers projecting both radially inwardly and outwardly so that the body part of the fastener is positioned midway between the components being fastened with contact between the components being by way of some of the fingers in the series.

The profile, in plan view, of the fastener 11 is circular typically to provide for the fastening of a pipe (component A) within a bore (in component B) so as to accommodate variations, typically in alignment, between the two components A, B while maintaining secure fastening. However the invention is not limited to a circular profile and the strip making up the fastener can be formed to any plan shape in order to accommodate a non-circular profile of an inner component into a bore of complementary form in an outer component where there is a relatively wide clearance between the outside of the inner component and the bore.

Figure 3:
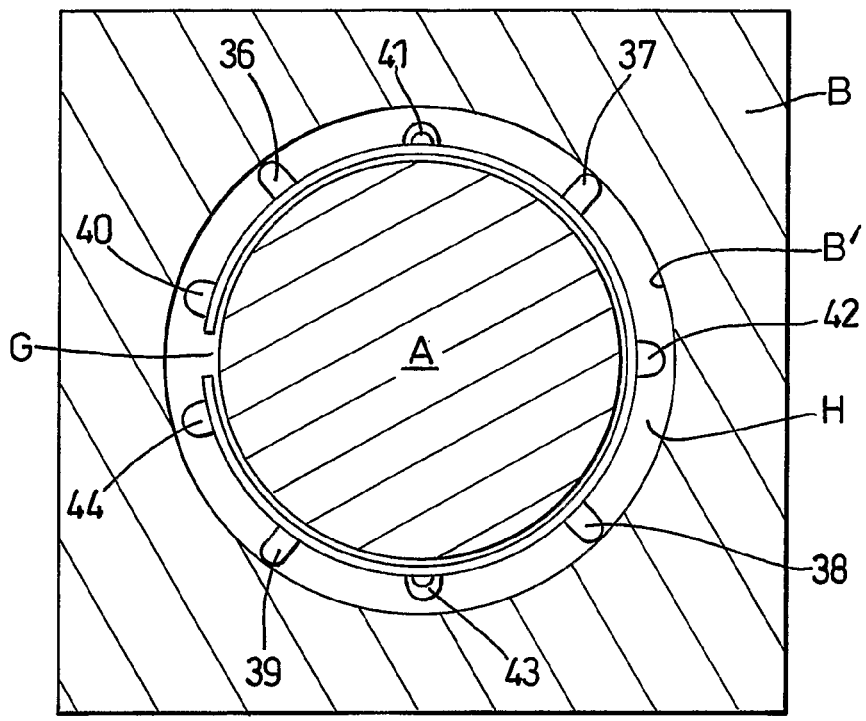
FIG. 3 is a plan view of a second embodiment.
Figure 4:
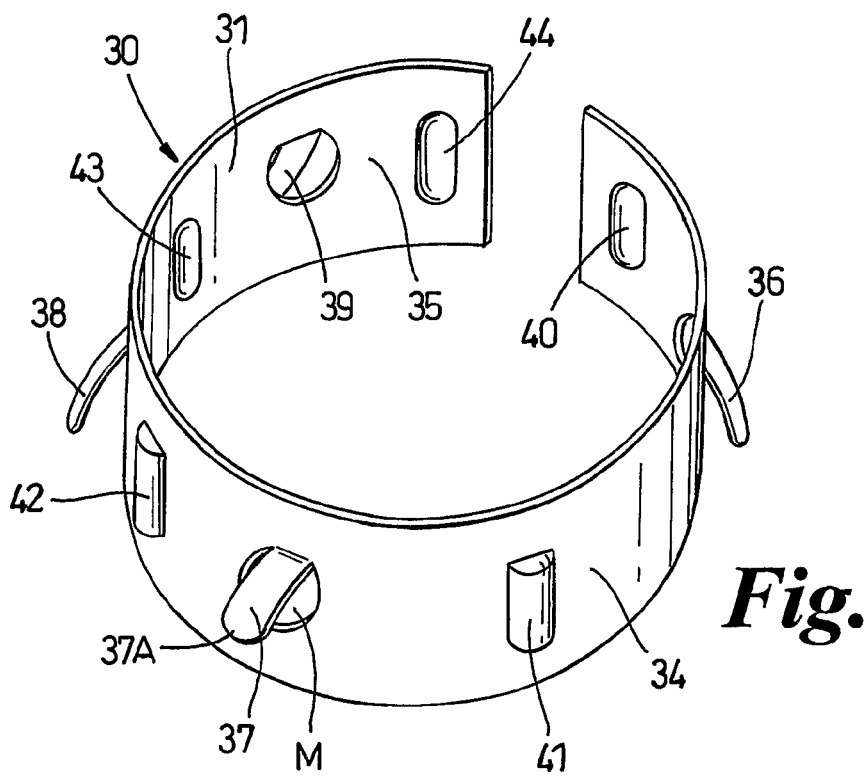
FIG. 4 is a perspective view of the fastener of FIG. 3.

Second Embodiment: FIGS. 3 and 4

These variously show a fastener 30 comprising a strip of spring steel formed into a ring member 31 which in plan view is profiled to conform to an annular gap H (FIG. 3) between a first component A bounded by the fastener 30 and a bore B' in a second component B (shown in dashed outline) bounding the fastener 30. The member 31 in this case is circular in plan (save for gap G) since it intended for location in the annular gap H. The member 31 has a first, outer, side 34 and a second, inner, side 35.

A series of four integral spring fingers 36-39 are spaced around member 31. Each finger 36-39 is parallel sided with shaped ends (typically end 37A) and is punched from the body of the strip to leave an elliptical aperture (typically aperture M) in the member 31.

A further series in this case of integral projections 40-44 are spaced around the member 31 and projecting from the outer side 34 of the member 31 that is to say projecting on the same side of the member 31 as the fingers 36-39.

The fingers 36-39 protrude from remainder of the outer side 34 by an amount greater than the than the maximum radial spacing in the annular space H between the assembled components A and B. On the insertion of the fastener 30 into the annular space H the fingers 36-39 are compressed against bore B' so providing frictional-resistance to axial movement of the fastener 30 within the bore B' that is to say movement perpendicular to the plane of the paper in FIG. 3.

The further series of projections 40-44 serve to provide for increased radial stiffness for the fastener 30 when in use. The projections 40-44 serve to almost fill the radial gap between the outer main surface of the member 12 and the inside of the bore B'. In the event a radial load is applied to the assembly the fastener will only be able to move a relatively small amount radially before the tops of one or more of the projections 40-44 contact the surface of bore B' after which further radial loading on the fastener will be resisted by the stiffness provided by projections 40-44 in the. further series. This stiffness will depend, upon other things, on the geometry of the projections 40-44.

The use of the series of spring fingers 36-39 and of the further series of projections 40-44 provide a two-stiffness fastener: relatively low for resisting sliding forces and provided by way of the spring fingers 36-39; relatively high for resisting radial deflection provided by way of the projections 40-44.

For a given application the fastener can be adapted to achieve a required performance by modifying one or more of the following characteristics:
profile and number of the fingers 36-39 and of the projections 40-44;
profile of the aperture formed in the body of the strip for each finger 36-39;
material from which the member 12 is made; and
dimensions of the strip.

In this second embodiment the fingers 36-39 project radially outwardly from the first, outer, side 34 of the member strip 12. Thus, as shown in FIG. 3 the fastener 30 seats by way of its second, inner, side 35 on first component A and engages the second component B by way of fingers 36-39.

In an alternate version the fingers can project radially inwardly from a second, inner side, of the strip so that the fastener seats by way of a first outer side on a bore wall in a second component and engages a first component by way of the inwardly projecting fingers.

This second embodiment makes use of a further series formed by discrete projections from the member. In an alternative version the further series can be formed of discrete waves or ripples formed as corrugations in the wall of the member between each individual member of the series of integral fingers. The waves or ripples can either project outwardly from the member, inwardly or project on both sides of a path defined by an un-deformed region of the member.

The profile, in plan view, of the fastener 30 is circular typically to provide for the fastening of a pipe (component A) within a bore B' (in component B) so as to accommodate variations in alignment, between the two components A, B while maintaining secure fastening. However the invention is not limited to a circular profile and the strip making up a fastener according to the invention can be formed to any plan shape in order to accommodate an annulus between non-circular profile of an inner component into a bore of complementary form in an outer component where there is a relatively wide clearance between the outside of the inner component and the bore in the outer component.

INDUSTRIAL APPLICABILITY

The fasteners of the present invention as evidenced by the two exemplary embodiments provides a fastener providing for the accurate alignment, as well as the fastening, of one component within another while accommodating temporary changes in alignment such as can arise by differential heating or cooling.

It is envisaged that more than one fastener according to the present invention could be used to align a given first component with a second component.

The invention claimed is:

1. An assembly comprising:
an outer member having a bore;
an inner member having an cylindrical outer surface and concentrically disposed in the bore of the outer member to define a radial gap between the bore and the outer surface; and
a fastener located in the radial gap between the outer and inner members, the fastener comprising:
a strip of flat material formed into a discontinuous ring having an axis, circumferential ends that define a circumferential gap therebetween, an inner surface and an outer surface, wherein the inner surface of the ring contacts the outer surface of the inner member;
a plurality of apertures formed in and circumferentially spaced apart about the ring;
a plurality of fingers integrally formed from the ring, each finger cantilevered from a respective one of the apertures and extending radially outwardly at a finger radial length relative to the axis such that a distal end of each finger engages an inner wall of the bore, wherein each finger is of a first outline and is produced by being punched from the strip so that each respective aperture differs in shape from the first outline; and
a plurality of projections integrally formed from the ring, circumferentially aligned with and alternating with the fingers, and extending radially outwardly at a projection radial length relative to the axis that is shorter than the finger radial length such that, when a radial load is applied to the assembly which bends the fingers radially inwardly, the projections contact the inner wall of the bore.

2. An assembly according to claim 1, wherein all of the fingers extend in a same axial direction.

3. An assembly according to claim 1, wherein the fingers have a first radial stiffness, and the projections have a second radial stiffness that exceeds the first radial stiffness.

4. An assembly according to claim 1, wherein each finger has a proximal end at a respective one of the apertures, and a radial distance between each finger and the ring only increases from the proximal end to the distal end.

* * * * *